United States Patent [19]

Lefevre

[11] Patent Number: 4,581,183

[45] Date of Patent: Apr. 8, 1986

[54] PACKING DEVICE FOR AN INSTALLATION PUTTING A LIQUID AND A GAS IN CONTACT

[75] Inventor: Philippe Lefevre, Brussels, Belgium

[73] Assignee: Engetra S.A., Fribourg, Switzerland

[21] Appl. No.: 679,012

[22] Filed: Dec. 6, 1984

[30] Foreign Application Priority Data

Dec. 30, 1983 [CH] Switzerland ................... 6997/83

[51] Int. Cl.[4] .............................................. B01F 3/04
[52] U.S. Cl. ....................................... 261/94; 156/60; 261/DIG. 72; 428/182
[58] Field of Search .................. 261/94–98, 261/112, DIG. 11, DIG. 72; 202/158; 210/150; 55/90, 240, 241; 428/179, 182, 184, 186, 181; 156/60, 295

[56] References Cited

U.S. PATENT DOCUMENTS

| | | | |
|---|---|---|---|
| 2,793,017 | 5/1957 | Lake | 261/112 |
| 3,281,307 | 10/1966 | Moeller et al. | 261/112 X |
| 3,618,778 | 11/1971 | Benton et al. | 210/150 |
| 3,704,869 | 12/1972 | Priestley | 55/241 X |
| 3,733,063 | 5/1973 | Loetel et al. | 261/DIG. 11 |
| 3,792,841 | 2/1974 | Munters | 261/DIG. 11 |
| 3,878,272 | 4/1975 | Priestley | 55/241 X |
| 4,186,159 | 1/1980 | Huber | 261/DIG. 72 |
| 4,344,899 | 8/1982 | Monjoie | 428/184 X |
| 4,361,426 | 11/1982 | Carter et al. | 428/182 X |

FOREIGN PATENT DOCUMENTS

| | | | |
|---|---|---|---|
| 1182828 | 3/1970 | United Kingdom | 261/112 |
| 1226259 | 3/1971 | United Kingdom | 261/112 |
| 1320505 | 6/1973 | United Kingdom | 261/112 |

Primary Examiner—Richard L. Chiesa
Attorney, Agent, or Firm—Wenderoth, Lind & Ponack

[57] ABSTRACT

A packing device includes a series of identical vertically corrugated streaming sheets, each streaming sheet comprising, in succession, in a direction parallel to the crests of the corrugations, at least two regions, namely a region of corrugations having a first amplitude and a region of corrugations having a smaller amplitude which are interconnected by a transition region. Each streaming sheet has an even number of regions of corrugations in phase opposition with respect to the adjacent region of corrugations and each streaming sheet has, in each transition region and in two longitudinal lateral regions a series of bosses having flat heads which project alternately from one side and the other of the streaming sheet in phase with the region of corrugations having the first amplitude which is adjacent and/or in phase opposition with respect to the adjacent region of corrugations of smaller amplitude. The streaming sheets are disposed alternately in one direction and in the opposite direction, which is achieved by turning over a streaming sheet, and are fixed to each other by an adhesive.

5 Claims, 9 Drawing Figures

PACKING DEVICE FOR AN INSTALLATION PUTTING A LIQUID AND A GAS IN CONTACT

BACKGROUND OF THE INVENTION

The present invention relates to installations for putting a liquid in contact with a gas and more particularly concerns a packing device for such an installation.

Installations putting a liquid in contact with a gas usually comprise a chamber or stack in which the packing device is installed. According to a known method, this device is constituted by a series of juxtaposed sheets on which the liquid, for example water, is sprayed, this liquid streaming along the sheets in counter-current with respect to the gas, for example air. These installations may serve to cool water, aqueous, saline, acid or other solutions by means of the air of the atmosphere.

SUMMARY OF THE INVENTION

An object of the invention is to provide a packing device formed by a series of streaming sheets which are light, very easy to manufacture, require reduced or no maintenance, have a high resistance to corrosion and to ice and moreover permit the obtainment of a good thermal exchange.

The invention therefore provides a packing device for an installation for putting a liquid in contact with a gas, constituted by a series of vertically corrugated identical streaming sheets which are fixed to each other and define passages therebetween, each streaming sheet comprising in succession in a direction parallel to the crests of the corrugations at least two regions, namely a region of corrugations of a first amplitude and a region of corrugations of smaller amplitude, which are interconnected by a transition region, wherein each streaming sheet has an even number of regions of corrugations of the same pitch, each corrugation region having a width identical to the width of the region disposed symmetrically relative to the longitudinal median plane orthogonal to the mean plane of the streaming sheet and passing through the longitudinal median axis and being in phase opposition to the adjacent corrugation region, and each streaming sheet has in each transition region and in two longitudinal lateral regions, a series of flat-headed bosses arranged longitudinally in the region of each crest of the corrugation regions and projecting alternately from one side and the other of the streaming sheet in phase with the region of corrugations of the first amplitude adjacent to and/or in phase opposition to the adjacent region of corrugations of smaller amplitude, each series of boss heads being at a distance which is identical to that of another series of bosses disposed symmetrically relative to said median plane, said streaming sheets being disposed alternately in one direction and in the opposite direction, which is achieved by turning a streaming sheet about said median axis, and being fixed to each other by adhesion of at least some boss heads of adjacent streaming sheets.

The corrugations of first amplitude have in particular a sinusoidal profile and the corrugations of smaller amplitude have a trapezoidal profile with rounded edges.

The sheets may moreover have in the corrugation regions gofferings orthogonal to the crests of the corrugations.

In a preferred embodiment of the invention, the sheets constituting the device are of thermoplastic material and are produced by thermoforming sheets of plastics material and, in particular, sheets of polyvinyl chloride.

A method for manufacturing a packing device according to the invention includes applying an adhesive to two series of streaming sheets by disposing the adhesive on at least the heads of some bosses projecting from one side, the adhesive being applied in respect of the first series on the boss heads of one side and, in respect of the second series, on the boss heads of the other side, and stacking on a first streaming sheet alternately the two series of adhesive-carrying sheets by disposing the adhesive-carrying sides downwardly, and by commencing in such manner that the first two streaming sheets are disposed one in one direction and the other in the other direction.

Note that, owing to their particular shape, the streaming sheets may be stacked, not after turning every other sheet about the longitudinal median axis and application of the adhesive on the appropriate side, but also after application of adhesive and rotation of every other sheet through 180° about a central axis perpendicular to the mean plane of the sheet.

Thus, by way of a modification, a single series of streaming sheets may be provided with adhesive by disposing the adhesive on at least the heads of some bosses projecting from one side, and stacking on a first streaming sheet said adhesive-carrying streaming sheets, and disposing the adhesive-carrying sides downwardly, by turning every other sheet through 180° about said central axis and commencing in such manner that the first two streaming sheets are disposed one in one direction and the other in the other direction.

In a preferred embodiment of the invention, in which sheets of thermoformed plastics material are employed, the viscosity of the adhesive is adjusted by addition of a thixotropic agent in such manner as to prevent the adhesive from running between the moment of application of the adhesive to a sheet and the moment of application of one sheet on another.

In the case of sheets of polyvinyl chloride, there is advantageously employed an adhesive based on polyvinyl chloride containing organic solvents having stepped boiling points, such as mixtures of tetrahydrofuran, acetone, methylethylketone, cyclohexanone and/or N-methylpyrrolidone. These solvents evaporate partly between the moment of application of adhesive to a sheet and the moment when the sheet is applied against another sheet and also contribute to the prevention of the running of the adhesive.

The invention will be described hereinafter in more detail with reference to the drawings which show only one embodiment.

BRIEF DESCRIPTION OF THE INVENTION

DETAILED DESCRIPTION OF THE INVENTION

Figure 1:
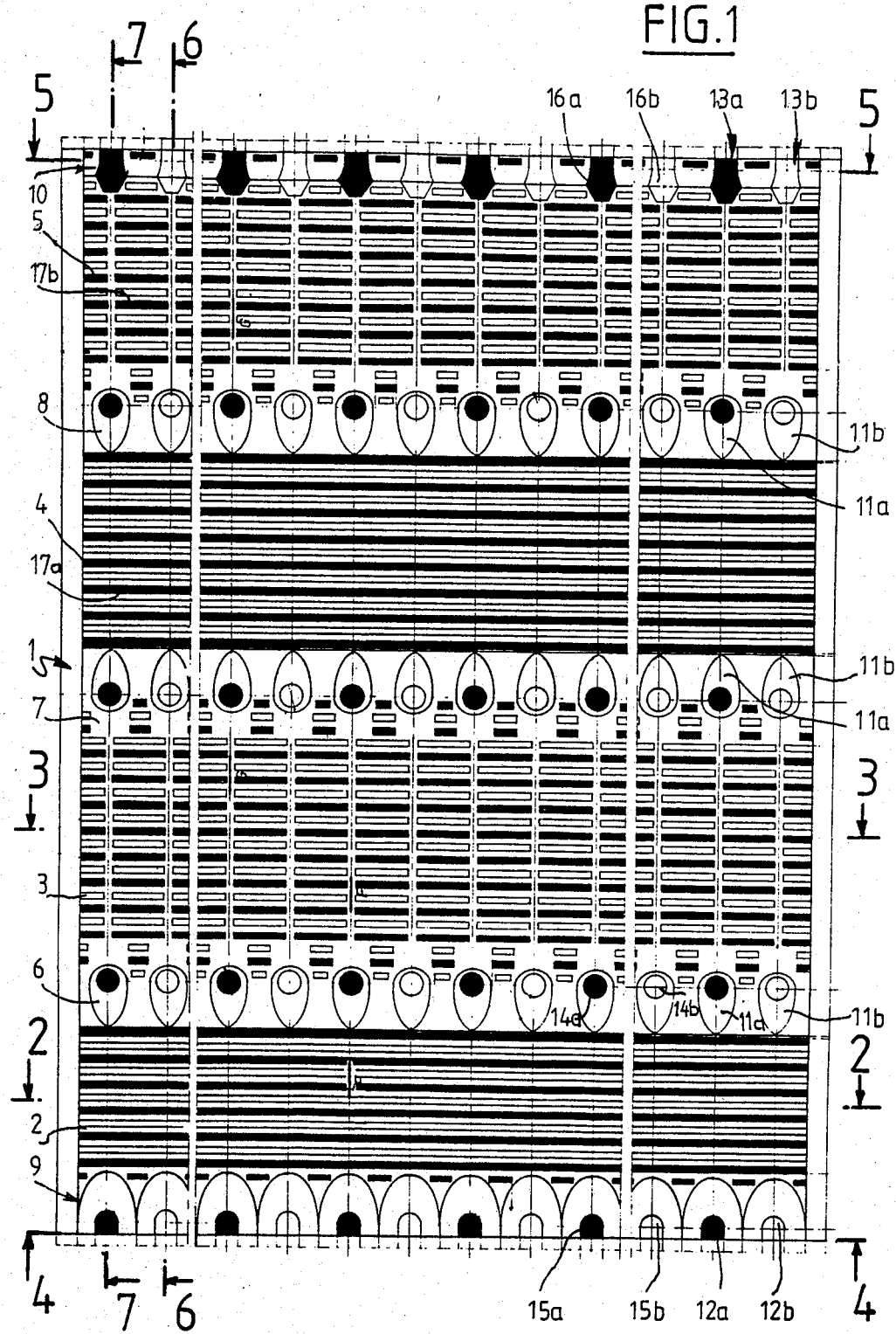
FIG. 1 is a front elevational view of a streaming sheet according to the invention in which the projecting parts are shown in black and the recessed parts are shown in white.

The streaming sheet 1 shown in FIG. 1 comprises four regions of corrugations 2, 3, 4 and 5 respectively.

Figure 2:
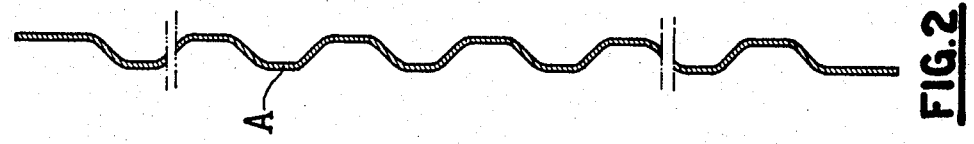
FIG. 2 is a sectional view taken on line 2—2 of FIG. 1.

In the regions 2 and 4, the corrugations have the same profile A. This profile is trapezoidal with rounded edges and is shown in FIG. 2.

Figure 3:
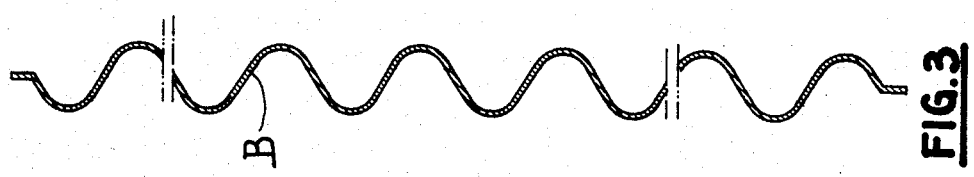
FIG. 3 is a sectional view taken on line 3—3 of FIG. 1.

In the regions 3 and 5, the corrugations have the same profile B. This profile is sinusoidal and has an amplitude which is larger than that of the profile A. This profile is shown in FIG. 3.

The corrugations corresponding to the profiles A and B have the same pitch. The corrugations in the adjacent regions are in phase opposition, ie. the corrugations in the regions 2 and 4 are in phase with each other and are in phase opposition with respect to the corrugations of the regions 3 and 5.

The widths of the corrugation zones 2 and 5, on one hand, and 3 and 4, on the other, are respectively the same, the width of the regions 2 and 5 being less than the regions 3 and 4.

The corrugation regions 2, 3, 4 and 5 are separated by transition regions 6, 7 and 8 respectively. Further, the sheet has longitudinal lateral regions 9 and 10 which border the regions 2 and 5 respectively.

The sheet has, in the transition regions 6, 7 and 8, a series of bosses 11a, 11b and, in the longitudinal lateral regions 9 and 10, a series of bosses 12a, 12b and 13a, 13b respectively.

The bosses 11a, 11b, 12a and 12b have the shape of a truncated cone having a flat head.

Figure 4:
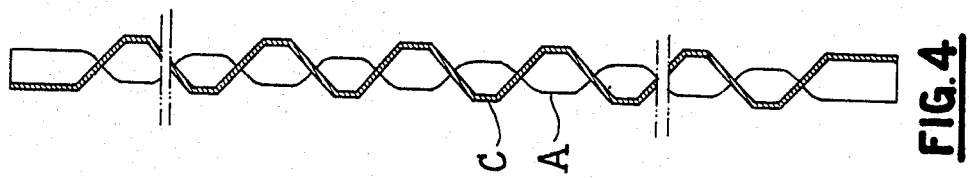
FIG. 4 is a sectional view taken on line 4—4 of FIG. 1.

In section, the profile C of the bosses 12a, 12b is trapezoidal. It is represented in FIG. 4, which also shows the corrugations of the region 2 having a profile A.

Figure 5:
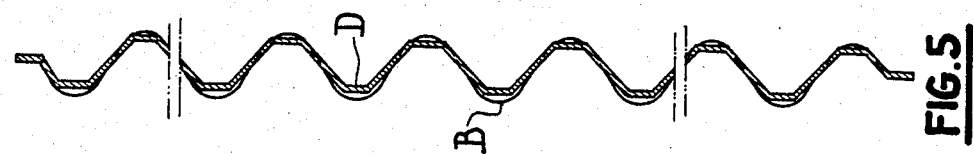
FIG. 5 is a sectional view taken on line 5—5 of FIG. 1.

The bosses 13a, 13b have a purely trapezoidal profile D. This profile is shown in FIG. 5 which also shows the corrugations having profile B.

The heads 14a, 14b, 15a, 15b, 16a, 16b of the bosses 11a, 11b, 12a, 12b, 13a, 13b respectively are disposed longitudinally in the transition regions 5, 6 and 7 and in the longitudinal lateral regions 9 and 10 in the region of each crest of the corrugation regions. The bosses 11a, 12a and 13a project from the mean plane of the sheet, and the bosses 11b, 12b and 13b are recessed relative to the mean plane of the sheet. The group of bosses 11a, 11b, 12a, 12b, 13a, 13b is disposed longitudinally so as to be in phase with the corrugation regions 3 and 5 and is therefore in phase opposition to the corrugation regions 2 and 4.

The bosses are disposed in the direction of the length of the sheet so that the distance between the heads 15a or 15b of the lateral region 9 and the heads 14a or 14b of the transition region 6 is equal to the distance between the heads 16a or 16b of the longitudinal lateral region 10 and the heads 14a or 14b of the transition region 8. Likewise, the distance between the heads 14a or 14b of the transition region 6 and the heads 14a or 14b of the transition region 7 is equal to the distance between the heads 14a or 14b of the transition region 7 and the heads 14a or 14b of the transition region 8.

Figure 6:
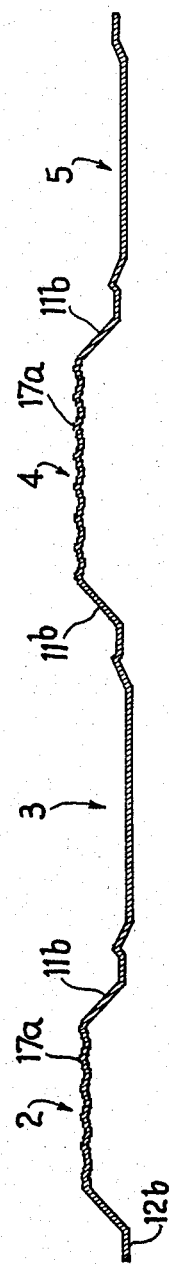
FIG. 6 is a sectional view taken on line 6—6 of FIG. 1.
Figure 7:
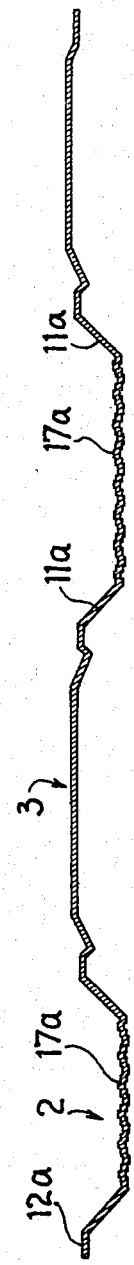
FIG. 7 is a sectional view taken on line 7—7 of FIG. 1.

The corrugation regions 2, 3, 4 and 5 have gofferings orthogonal to the crests of the corrugations. In the regions 2 and 4, the gofferings 17a are continuous, while in the regions 3 and 5, the gofferings 17b disappear in the vicinity of the crests. FIGS. 6 and 7 show the profile of the gofferings 17a. These gofferings have successive regions of three different levels. The gofferings 17b have an identical profile.

These gofferings form a succession of bosses and recesses which "break" the films of water which stream on each side of the sheet and increases the time during which the water passes along the sheet and therefore the contact time.

Figure 8:
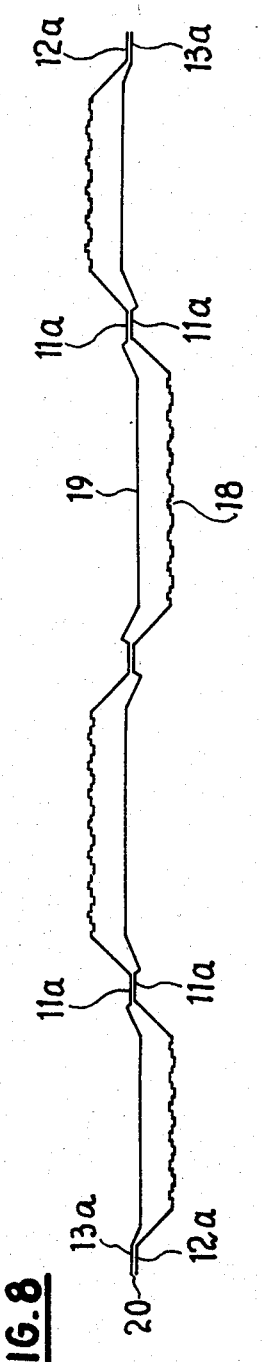
FIG. 8 is a sectional view of the assembly of two sheets, the section being similar to that used for FIG. 7, and, FIG. 9 is a perspective view of a machine for manufacturing a device according to the invention.

FIG. 8 shows the assembly of two streaming sheets 18 and 19 which are identical to those shown in FIG. 1. The sheet 19 is applied on the sheet 18 after turning it about the longitudinal median axis. The heads of the bosses 13a of the sheet 19 confront the bosses 12a of the sheet 18 and vice-versa. Likewise, the heads of the bosses 11a of the region 8 of the sheet 19 confront the heads of the bosses 11a of the region 6 of the sheet 18a and vice-versa, while the heads of the bosses 11a of the region 7 of the two sheets confront each other. The various boss heads disposed in confronting relation to each other are interconnected by an adhesive 20.

Figure 9:
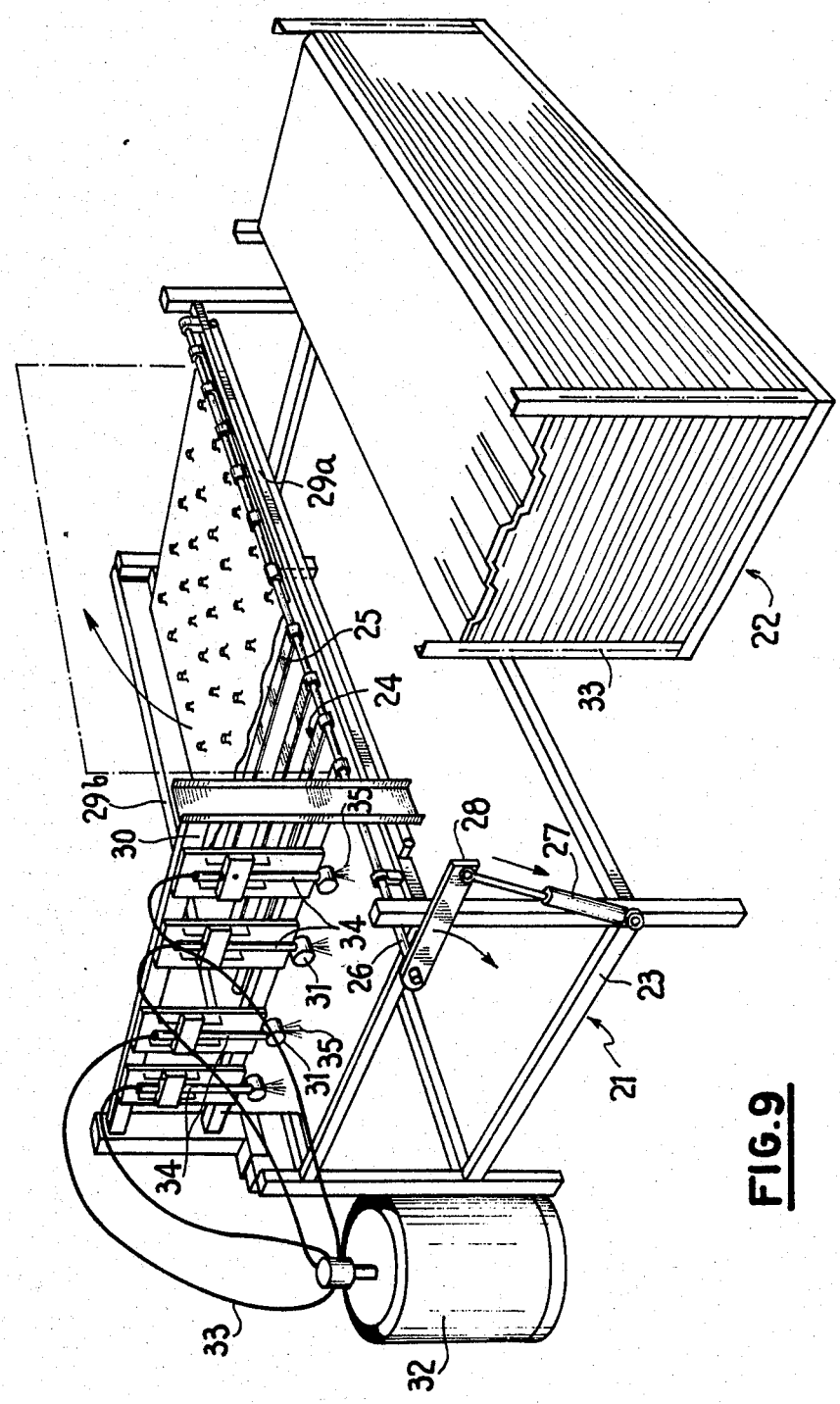

An installation for manufacturing a packing device according to the present invention is shown in FIG. 9.

This installation comprises mainly an adhesive-applying table 21 and a stacking container 22.

The adhesive-applying table 21 has a frame 23 which supports a top 24. The latter is formed by a series of bars 25 disposed in such manner as to have a pitch corresponding to the pitch of the corrugations of the sheets. A number of the bars 25 are pivotable about a horizontal axis 26, under the action of a cylinder device 27 through a lever arm 28, so as to leave the horizontal position and assume the vertical position (shown in dot-dash lines).

The table 21 carries in its upper part two longitudinally extending rails 29a and 29b on which an adhesive-applying bridge 30 is slidable. This bridge supports four or five supply valves 31 operating on the open or closed principle. These valves are connected to a tank 32 containing adhesive under pressure through flexible pipes 33 and rigid pipes 34 connected to the bridge 30. The valves are disposed at the lower end of the rigid pipes 34 and open onto the adhesive-applying heads 35. The assembly comprising the pipes 34, the valves 31 and the heads 35 is capable of moving alternately between an upper position and a lower position under the action of a mechanism (not shown) controlled by the bars 25. The heads 35 are provided with adhesive-applying brushes.

The streaming sheets on which the adhesive is to be applied are placed flat in a frame formed on the top of the table. The horizontal position of the adhesive-applying heads 35 on the bridge 30 is so adjusted as to be at the level of the heads of the bosses projecting from the sheet, corresponding to the regions 9, 6, 8 and 10 in the case shown in FIG. 9, and the lower vertical position of these heads is so adjusted that the brushes come into contact with the boss heads. The bridge 30 is automatically moved along the rails 29a and 29b and the movement of the heads 35 is so adjusted that the heads 35 are lowered only onto the projecting boss heads. The adhesive is continuously injected during the displacement of the bridge 30. The viscosity of the adhesive is sufficient to prevent the running of the adhesive so that the adhesive is only applied to the boss heads. By way of a modification, the adhesive applying heads 35 may be devoid of brushes and provided with an injecting orifice of small dismater and the adhesive is injected in a discontinuous manner through these injection orifices, the injection being controlled by the valves 31.

When the adhesive has been fully applied, the streaming sheet is ejected by pivoting the movable bars 25. After having completely turned over the sheet following on the pivoting, the sheet is inserted in the stacking container 22 which is defined by a frame 33.

Each sheet is consequently stacked in a horizontal position so that the side carrying the adhesive faces downwardly.

When starting the manufacture of the packing device, a first sheet is disposed horizontally in the bottom of the container 22 in a first orientation. Then a second sheet having the same orientation on the table has adhesive applied thereto. This sheet, after having received the adhesive and having been turned over and applied against the first sheet, then has an orientation which is the opposite of that of the first sheet and the boss heads of the first side of the second sheet assume a position in confronting relation to the boss heads of the first side of the first sheet.

The third sheet is disposed on the adhesive-applying table with an opposite orientation, that is, it is its second side which is uppermost. After application of the adhesive and turning over the sheet, this second side of the third sheet is applied against the second side of the second sheet.

The stacking is continued in this way by alternating each time the orientation of the sheet which receives the adhesive and consequently the orientation of the sheet in the stack.

By way of example, each packing device may comprise twenty-five sheets of polyvinyl chloride. The distance between a sheet n and a sheet n+2 may be 40 mm, the depth of the bosses relative to the mean plane of a sheet being 10 mm.

The width of the sheets may be 50 cm and the length of the sheets 2 m. The pitch of the corrugations may be 56 mm.

What is claimed is:

1. A packing device for an installation for putting a liquid and a gas in contact with each other, said device comprising a series of identical streaming sheets which have vertical corrugations having crests and are fixed to each other and define passages therebetween, each streaming sheet comprising, in succession, in a direction parallel to the crests of the corrugations, at least two regions, namely a first region of corrugations having a first amplitude and a second region of corrugations having a smaller amplitude, a transition region interconnecting said first region and said second region, each streaming sheet having an even number of corrugation regions of identical corrugation pitch, each corrugation region having a width identical to a width of a region disposed symmetrically relative to a longitudinal median plane orthogonal to a mean plane of the streaming sheet and passing through a longitudinal median axis of the streaming sheet and being in phase opposition with respect to an adjacent corrugation region, and each streaming sheet having, in each transition region, and in two longitudinally extending lateral regions, a series of bosses each having a flat head and disposed longitudinally of the streaming sheet in alignment with each crest of the corrugation regions and projecting alternately from one face and an opposed face of the streaming sheet in phase with an adjacent said first region of corrugations and/or in phase opposition with respect to an adjacent said second region of corrugations, each series of boss heads being at a distance from said median plane which is identical to a distance between another symmetrically disposed series of bosses and said median plane, said streaming sheets being disposed alternately in one direction and in an opposite direction, which opposite direction is obtained by turning a streaming sheet over and about said median axis, and said streaming sheets being fixed to each other by an adhesive applied to at least some adjacent streaming sheet boss heads.

2. A device according to claim 1, wherein said first corrugations of the streaming sheets have a sinusoidal profile and said second corrugations of the streaming sheets have a trapezoidal profile with rounded corners.

3. A device according to claim 1, wherein the streaming sheets comprise gofferings in the corrugation regions which gofferings are orthogonal to the crests of the corrugations.

4. A device according to claim 1, wherein the streaming sheets are the result of a thermoforming of sheets of plastics material.

5. A device according to claim 4, wherein the sheets are of polyvinyl chloride.

* * * * *